US009542476B1

(12) United States Patent
Allon et al.

(10) Patent No.: US 9,542,476 B1
(45) Date of Patent: *Jan. 10, 2017

(54) REFINING SEARCH QUERIES

(71) Applicant: GOOGLE INC., Mountain View, CA (US)

(72) Inventors: Ori Allon, New York, NY (US); Ugo Di Girolamo, Menlo Park, CA (US); Tomer Shmiel, Ramat-Gan (IL); Alexandre Petcherski, San Francisco, CA (US); Tzvika Hartman, Mazkeret Batya (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,700

(22) Filed: Apr. 22, 2015

Related U.S. Application Data

(63) Continuation of application No. 13/756,473, filed on Jan. 31, 2013, now Pat. No. 9,020,926, which is a continuation of application No. 12/726,157, filed on Mar. 17, 2010, now Pat. No. 8,392,443.

(60) Provisional application No. 61/160,841, filed on Mar. 17, 2009.

(51) Int. Cl.
G06F 17/30 (2006.01)

(52) U.S. Cl.
CPC ..... *G06F 17/30672* (2013.01); *G06F 17/3053* (2013.01); *G06F 17/30648* (2013.01)

(58) Field of Classification Search
CPC ............... G06F 17/30864; G06F 17/30646; G06F 17/30648; G06F 17/30657; G06F 17/30672

USPC ................. 707/759, 766, 767, 765
See application file for complete search history.

(56) References Cited

U.S. PATENT DOCUMENTS

| | | | |
|---|---|---|---|
| 6,014,665 A | 1/2000 | Culliss | |
| 6,947,930 B2 * | 9/2005 | Anick | G06F 17/30646 715/234 |
| 7,685,191 B1 * | 3/2010 | Zwicky | G06F 17/30867 707/706 |
| 7,953,730 B1 | 5/2011 | Bleckner et al. | |
| 8,005,643 B2 | 8/2011 | Tunkelang et al. | |
| 2004/0186827 A1 * | 9/2004 | Anick | G06F 17/30646 707/999.003 |
| 2006/0005113 A1 * | 1/2006 | Baluja | G06F 17/30873 715/207 |
| 2006/0031183 A1 * | 2/2006 | Oral | G06F 17/30011 707/999.001 |

(Continued)

*Primary Examiner* — Vincent Boccio
(74) *Attorney, Agent, or Firm* — Fish & Richardson P.C.

(57) ABSTRACT

Methods, systems, and apparatus, including computer program products, for refining search queries. In one implementation, a method includes obtaining a submitted search query, and in response to obtaining the search query: obtaining search results responsive to the search query; selecting a document from a group of documents identified by the search results; generating from a subset of one or more entities associated with the document one or more candidates for refined search queries, including: identifying one or more terms in the search query, where the one or more terms occur in the search query in a particular order relative to each other, and combining the one or more terms with the entity to generate a candidate, where the one or more terms occur in the particular order relative to each other; and identifying one or more of the candidates as being refined search queries for providing with the search results.

21 Claims, 4 Drawing Sheets

(56) References Cited

U.S. PATENT DOCUMENTS

2006/0129531 A1 6/2006 Bates
2007/0239662 A1* 10/2007 Fontes .............. G06F 17/30864
　　　　　　　　　　　　　　　　　　707/999.002
2009/0006382 A1 1/2009 Tunkelang et al.

* cited by examiner

REFINING SEARCH QUERIES

CROSS-REFERENCE TO RELATED APPLICATIONS

This application is a continuation application of, and claims priority to, pending U.S. patent application Ser. No. 13/756,473, filed on Jan. 31, 2013, entitled "Refining Search Queries," which is a continuation application of, and claims priority to, U.S. patent application Ser. No. 12/726,157, filed on Mar. 17, 2010, entitled "Refining Search Queries," which claims priority to U.S. Provisional Patent Application No. 61/160,841, filed on Mar. 17, 2009, entitled "Refining Search Queries," the entirety of which is herein incorporated by reference.

BACKGROUND

This specification relates to data processing, and in particular, to computer implemented search services.

Internet search engines provide information about Internet accessible resources (e.g., web pages, images, documents, multimedia content) that are responsive to a user's search query by returning a set of search results in response to the query. A search result includes, for example, a Uniform Resource Locator (URL) and a snippet of information for resources responsive to a query. The search results can be ranked (e.g., in an order) according to scores assigned to the search results by a scoring function.

SUMMARY

In general, one aspect of the subject matter described in this specification can be embodied in methods that include the actions of obtaining a submitted search query, and in response to obtaining the search query: obtaining search results responsive to the search query; selecting a document from a group of documents identified by the search results; generating from a subset of one or more entities associated with the document one or more candidates for refined search queries, including: identifying one or more terms in the search query, where the one or more terms occur in the search query in a particular order relative to each other, and combining the one or more terms with the entity to generate a candidate, where the one or more terms occur in the particular order relative to each other; and identifying one or more of the candidates as being refined search queries for providing with the search results. Other embodiments of this aspect include corresponding systems, apparatus, and computer program products.

These and other embodiments can optionally include one or more of the following features. Generating the one or more candidates further includes determining that an entity is a candidate when a score associated with the entity is beyond a threshold score. Generating the one or more candidates further includes replacing a first identified term with a synonym of the first identified term when combining the one or more terms with the entity. The documents are each associated with a ranking, and selecting the document includes selecting a document with a ranking beyond a threshold ranking.

The method further includes ranking each of the one or more entities according to a respective frequency of occurrence of the entity as a previously-submitted search query; and determining that the subset of the identified entities includes only the entities with a ranking beyond a threshold rank. The method further includes ranking each of the one or more entities according to a measure of a respective frequency of occurrence of the entity in the group of documents; and determining that the subset of the identified entities includes only the entities with a ranking beyond a threshold rank. The measure is an inverse document frequency (IDF).

Particular embodiments of the subject matter described in this specification can be implemented to realize one or more of the following advantages. Refining search queries reduces how much user interaction is required to obtain alternatives to an input search query and perform searches using one or more of the alternatives. In addition to saving time, providing refined search queries can increase the precision, accuracy, and coverage of a search by capturing alternatives to the input search query that are directed to what a user may consider to be relevant to the search. The captured alternatives can help users better understand context associated with the input search query, help users better understand different, possible interpretations of the input search query, and help users resolve ambiguities caused by the different, possible interpretations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
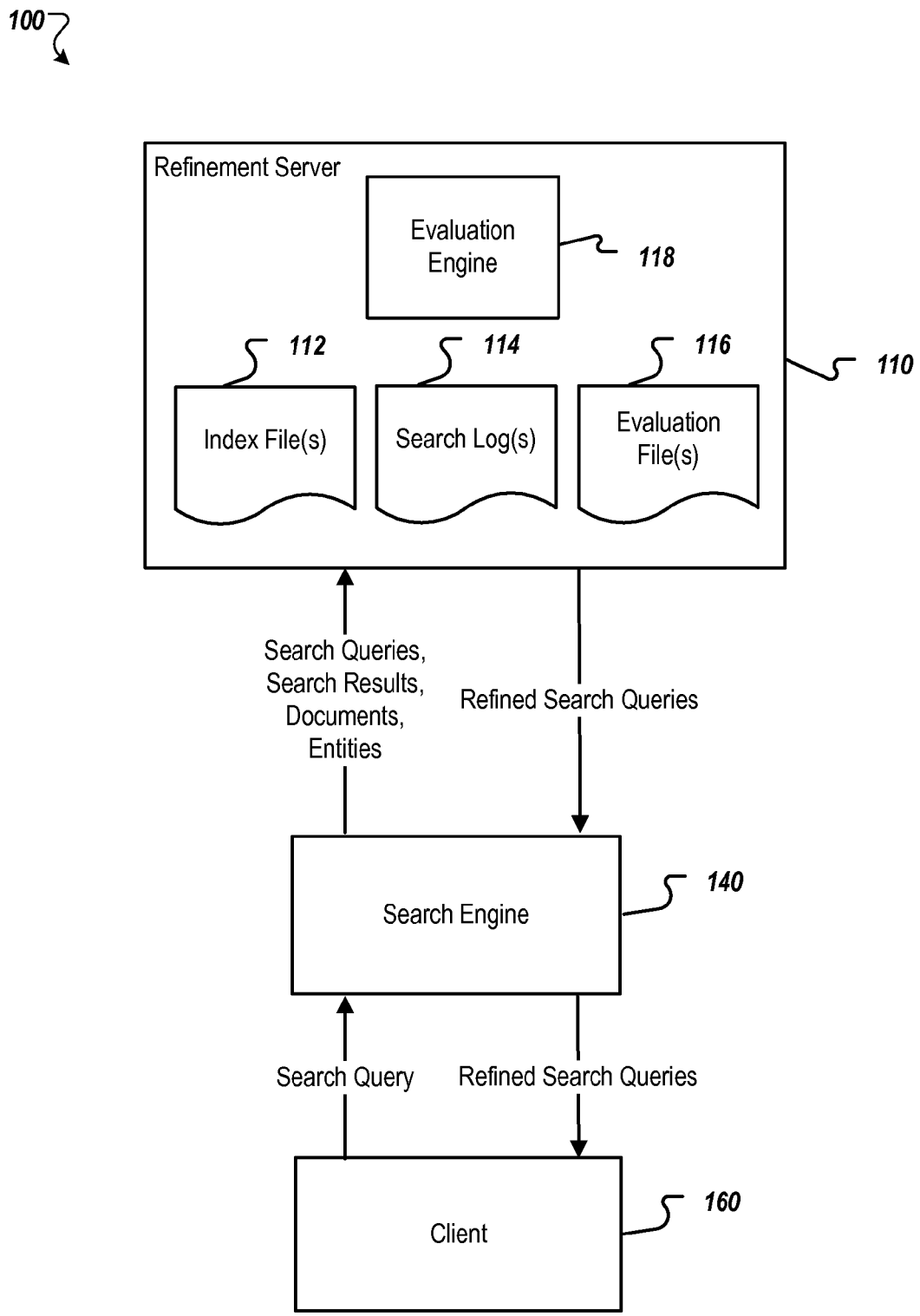
FIG. 1 is a block diagram illustrating an example of a flow of data in some implementations of a system that generates refined search queries.

FIG. 1 is a block diagram illustrating an example of a flow of data in some implementations of a system 100 that generates refined search queries. The system 100 can be implemented in an internet, intranet, or other client/server or cloud computing environment. The system 100 is an example of a system in which the systems, components and techniques described below can be implemented. Although several components are illustrated, there may be fewer or more components in the system 100. Moreover, the components can be implemented on one or more computing devices as executable computer programs where the devices are connected by one or more networks or other suitable communication mediums.

A refinement server 110 is configured to receive search queries and documents responsive to those queries. A search engine 140 can receive input, e.g., a search query, submitted to a search engine through a user interface (e.g., a natural language speech interface or a graphical user interface) of a client 160. The client 160 can be, for example, a personal computer or a mobile computing device such as a notebook computer, a smart phone, a portable gaming device, or a tablet computer. The search engine 140 receives the search query and generates search results that are responsive to, e.g., relevant to, the search query. The search results identify the documents that are provided to the refinement server 110. The search engine can also provide to the refinement server 110 the search query and rankings for the documents.

The documents received by the refinement server 110 can be associated with entities. An entity associated with a document is in the same natural language as the document and constitutes a meaningful, self-contained concept. The entity can also be found in the associated document. An entity can include a word, a phrase, and/or other character strings, for instance. In some implementations, an entity is a sequence of one or more characters with a frequency of occurrence as a previously-submitted search query that is greater than a threshold frequency of occurrence. The frequency of occurrence can be defined as the number of times the previously-submitted search query is submitted for searching in a predetermined amount of time, e.g., one day. In some implementations, a document is assigned one or more entities.

As an example, the search engine 140 can receive a search query "Mona Lisa" from the client 160. The search engine 140 can identify search results that are responsive to the search query "Mona Lisa". The search results can identify documents that are relevant to the search query. Entities including "Leonardo da Vinci", "Louvre", "renaissance", and other character strings associated with the Mona Lisa can be associated with the documents by the search engine 140 and provided to the refinement server 110.

Note that the examples described in this specification illustrate implementations in English. However, the systems and techniques described in this specification can be implemented in a similar manner to refine search queries in other languages (and writing systems), e.g., Russian (Cyrillic), Hindi (Devanagari), Chinese (Hanzi), Chinese (pinyin), Japanese (Kanji), and Japanese (Romanji).

The refinement server 110 is able to access one or more index files 112, search logs 114, evaluation files 116, and an evaluation engine 118. The evaluation engine 118 can use the index files 112, search logs 114, and evaluation files 116 to generate refined search queries in real time, as described in further detail below. The generation of refined search queries can be considered in real time, because entities that are used to generate the refined search queries are entities that are associated with documents identified by search results obtained in response to obtaining a submitted search query, e.g., a currently-submitted search query.

The index files 112 store associations between documents and entities. The index files 112 include one or more data structures and/or entries that include or otherwise identify entities associated with documents. An electronic document (which for brevity will simply be referred to as a document) does not necessarily correspond to a file. A document may be stored in a portion of a file that holds other documents, in a single file dedicated to the document in question, or in multiple coordinated files. Moreover, a document may be stored in a memory without having been stored in a file. Examples of documents include web pages, images, word processing documents, electronic games, computer program source code, audio content, movies, books, and other content. The index files 112 can include data structures that serve to map entities to documents that are searchable by the search engine 140. As an example, the index files 112 can include searchable sets of words and phrases found in web pages and corresponding locations of the web pages (e.g., in a cache or on the World Wide Web) that contain the words or phrases.

In some implementations, the entities associated with a document are previously-submitted search queries for which search results that identify the document have been returned. The index files 112 can include previously-submitted search queries that satisfy a particular criteria and identification of documents (e.g., Uniform Resource Locators) responsive to those queries. For example, the index files 112 can include previously-submitted search queries that occur more than a predetermined number of times in the search logs 114. As another example, the index files 112 can include previously-submitted search queries for which search results have been presented and selected more than a predetermined number of times.

In various implementations, the entities associated with a document can be scored and ranked according to their respective scores. In further implementations, the scores of each entity can be stored in the index files 112 or in other storage. In some implementations, a score for an entity is generated by calculating the inverse document frequency (IDF) of each token, e.g., word, in the entity. The IDF is calculated by dividing a total number of documents by the number of documents containing the entity and taking the logarithm of the quotient. The score for the entity can be based on the sum of the IDFs of each word in the entity. For example, the score of the entity "Mona Lisa" can be calculated as the sum of the IDF of "Mona" and the IDF of "Lisa". Other ways of determining a score for an entity are possible.

As the score of an entity increases, the likelihood that the entity is important or relevant to a document responsive to the search query also increases. Therefore, entities of a document with a higher score are also ranked higher than entities with a lower score. In some implementations, a score for an entity is generated by determining a co-occurrence relationship between the entity and a search query. In general, the score for the entity can be increased as the frequency of co-occurrence of the entity and the search query in the document increases.

In some implementations, the score of an entity is increased as the number of times the entity is found in a previously-submitted query increases. In addition, each selection of a presented document such as an image, for example, is recorded as a "click" for the document in connection with the previously-submitted query. A timer can be used to track how long a user views or "dwells" on the document. For example, a longer time spent dwelling on a document (i.e., a long click) can indicate that a user found the document to be relevant for the previously-submitted query. A brief period viewing a document (i.e., a short click) can be interpreted as a lack of document relevance. The score of an entity can be increased as the likelihood of the entity being in a previously-submitted query and leading to a long click increase. The likelihood can be calculated based on click data that includes a count of each click type (e.g., long, medium, short) for a particular search query (that includes the entity) and document combination. The score of the entity can increase as the ratio of long clicks to total clicks for the particular search query increases.

In some implementations, the scores are modified based on other criteria or parameters. As an example, the score of an entity can be increased if the entity is found in the title of a document. The score of an entity can be increased as the number of times the entity is found in a previously-submitted query increases, as the number of documents in which the entity is found increases, as the number of documents in which the entity is included in the title of the document increases, and as the number of tokens in the entity increases.

In some implementations, only a subset, e.g., a proper subset, of the group of entities is used to generate refined search queries. The refinement server 110 can use the rankings of the documents provided by the search engine 140 and the index files 112 to identify entities for documents provided by the search engine 140. For example, the refinement server 110 can use the rankings of the documents provided by the search engine 140 and the index files 112 to identify entities for top-ranked documents, e.g., entities for the top one hundred documents according to the rankings. The identified entities for the top-ranked documents can be included in a group of entities that are used to refine search queries. In some implementations, entities that are found in a number of documents that is less than a specified number can be removed from the group.

The search logs 114 store previously-submitted search queries and information related to the previously-submitted search queries. The search logs 114 include one or more data structures and/or entries that include or otherwise identify previously-submitted search queries. The search logs 114 can include search criteria previously used to determine search results for a previously-submitted search query. In some implementations, the search logs 114 include one or more of the following information items for each search query: the search query, frequency of submission over a period of time, dates and times of submission, language of the search query, and/or other information associated with the search query. For example, the search logs 114 can identify, for a particular search query, a series of words previously searched by a search engine and a frequency, rank or other indicia for indicating a level of importance of the particular search query. The search logs 114 can be associated with a single search engine (e.g., search engine 140) or with multiple search engines. In addition, the search logs 114 can be associated with a specific time period (e.g., day, week, year), specific types of search queries, specific topics of search queries, or other subsets of search queries.

The evaluation files 116 store information related to generating refined search queries. The evaluation files 116 include parameters, variables, instructions (e.g., instructions in the form of modules), rules, objects or guidelines for generating and evaluating candidates for refined search queries, e.g., potential refined search queries. In some implementations, the evaluation files 116 include instructions for performing the operations of generating candidates for refined search queries using a search query and entities associated with documents relevant to the search query, and evaluating the candidates using one or more criteria to identify refined search queries.

The evaluation files 116 can include rules for generating candidates for refined search queries. In some implementations, entities are combined with portions of a search query to generate candidates for refined search queries. The one or more terms of the search query that are used in a combination can be identified based on respective IDFs of each of the one or more terms. In particular, terms with an IDF that is beyond, e.g., greater than, a threshold IDF can be considered important and used in the combinations. The combinations can be performed according to one or more rules or guidelines, as discussed below.

In some implementations, entities are identified as being candidates for refined search queries. An entity itself can be identified as being a candidate when the score associated with the entity is beyond a threshold score. As an example, entities associated with scores greater than the threshold score can be identified as being candidates, and entities with scores less than the threshold score can be combined with portions of a search query to generate candidates.

In some implementations, the order of a sequence of terms in the search query is maintained when generating a candidate. The terms from the search query occur in a same order relative to each other in the candidate as the order the terms occurred relative to each other in the search query. As an example, a search query can be the sequence of terms "$X_1$ $X_2$ $X_3$". A candidate includes a combination of one or more of these terms with an entity "E". If $X_1$ is included in the sequence, $X_1$ must occur in the sequence before $X_2$ (and $X_3$) if $X_2$ (and $X_3$) are also included in the sequence. If $X_2$ is included in the sequence, $X_2$ must occur before $X_3$ in the sequence. Possible candidates include "E $X_1$ $X_2$ $X_3$"; "$X_1$ E $X_2$ $X_3$"; "$X_1$ $X_2$ E $X_3$"; "$X_1$ $X_2$ $X_3$ E"; "E $X_1$ $X_2$"; "$X_1$ E $X_2$"; "$X_1$ $X_2$ E"; "E $X_2$ $X_3$"; "$X_2$ E $X_3$"; "$X_2$ $X_3$ E"; "E $X_1$ $X_3$"; "$X_1$ E $X_3$"; "$X_1$ $X_3$ E"; "E $X_1$"; "$X_1$ E"; "E $X_2$"; "$X_2$ E"; "E $X_3$"; and "$X_3$ E".

As an example application of this rule, a query "what to do after surgery" and entity "pain medications" can be combined to generate a candidate "pain medications after surgery". Note that the original order in the sequence of "after" followed by "surgery" is maintained. The application of other rules are also shown in this example. The example also demonstrates a combination of the entity with less than all the portions of the search query. The candidate does not include "what to do". Furthermore, the example demonstrates a rule where the entity is not divided or broken. Rather, the entity as a whole is included in the candidate.

In some implementations, one or more original terms of the search query are substituted with synonyms or other related terms. The synonyms or other related terms are used instead of a respective original term in a combination with the entity to generate a candidate. Returning to the previous example for the search query "$X_1$ $X_2$ $X_3$", synonyms $Y_1$ and $Z_1$ for $X_1$ can be identified using conventional techniques. Replacing $X_1$ with $Y_1$, possible candidates would further include "E $Y_1$ $X_2$ $X_3$"; "$Y_1$ E $X_2$ $X_3$"; "$Y_1$ $X_2$ E $X_3$"; "$Y_1$ $X_2$ $X_3$ E"; "E $Y_1$ $X_2$"; "$Y_1$ E $X_2$"; "$Y_1$ $X_2$ E"; "E $Y_1$ $X_3$"; "$Y_1$ E $X_3$"; "$Y_1$ $X_3$ E"; "E $Y_1$"; and "$Y_1$ E". Replacing $X_1$ with $Z_1$, possible candidates would further include "E $Z_1$ $X_2$ $X_3$"; "$Z_1$ E $X_2$ $X_3$"; "$Z_1$ $X_2$ E $X_3$"; "$Z_1$ $X_2$ $X_3$ E"; "E $Z_1$ $X_2$"; "$Z_1$ E $X_2$"; "$Z_1$ $X_2$ E"; "E $Z_1$ $X_3$"; "$Z_1$ E $X_3$"; "$Z_1$ $X_3$ E"; "E $Z_1$"; and "$Z_1$ E".

As an example application of this rule, a query "paris accommodation" and entity "eiffel tower" can be combined to generate a candidate "paris hotels eiffel tower". Note that the term "accommodation" is substituted with the term "hotels". As another example, a query "roma travel" and an entity "the sistine chapel" can be combined to generate a candidate "the sistine chapel rome". Note that the candidate does not include "travel" and that the term "roma" is substituted with the term "rome".

The evaluation files 116 can also include instructions for identifying a candidate as being a refined search query. The refined search query can be provided to a user as a selectable alternative to a search query.

The evaluation files 116 can include rules for identifying refined search queries from the candidates. In some implementations, only candidates that are found in the search logs 114 are identified as being refined search queries. In some implementations, the candidates are scored and candidates with a score beyond, e.g., greater than, a threshold score are identified as being refined search queries. In some implementations, a predetermined number of candidates with the highest scores are identified as being refined search queries. For example, the evaluation files 116 can include instructions for ranking the candidates based on a number of occurrences in the search logs 114 and selecting the top eight candidates, e.g., the candidates with the eight highest scores.

The evaluation files 116 can include instructions for identifying a candidate as being a selectable alternative to the search query based on a number of words in the candidate, an amount of overlap between the candidate and an entity, an amount of overlap between the candidate and the search query, a number of times the candidate appears in the search logs 114, a sum of the IDF of all the terms in the candidate, or an IDF of the most unique term in the candidate. As an example, the evaluation files 116 can include instructions for evaluating the candidates based on implicit user feedback. As an example, the candidates can be evaluated based on a click-through rate (CTR) for search queries that include the candidates. The CTR can be calculated from the information in the search logs 114.

The evaluation engine 118 of the refinement server 110 can use the index files 112, search logs 114, and evaluation files 116 to identify entities for a search query and generate refined search queries from the search query and one or more of the entities. The refinement server 110 can provide the refined search queries for display on the client 160. In some implementations, the refinement server 110 provides the refined search queries (and entities) to the search engine 140 for further refinement by the search engine 140.

Figure 2:
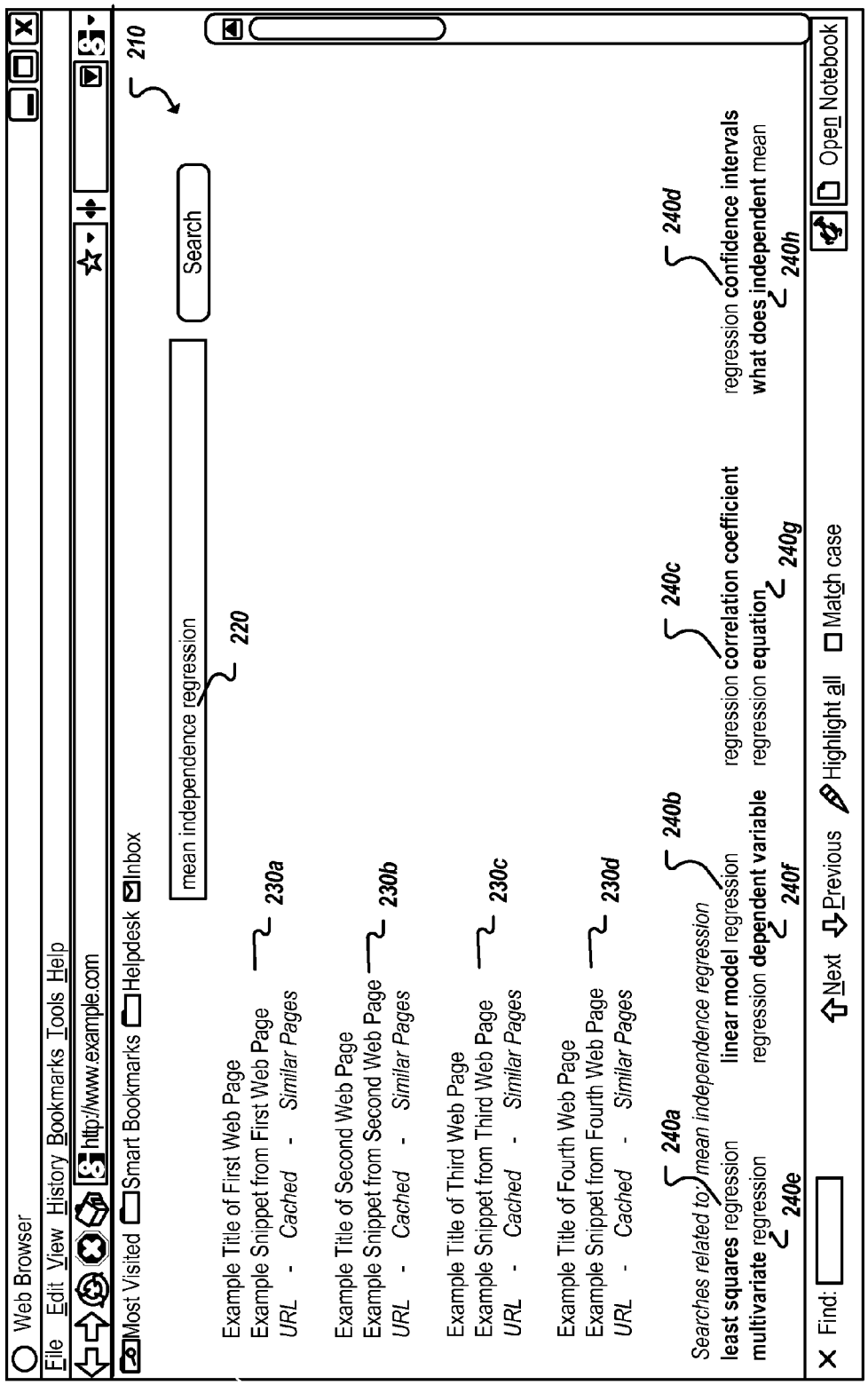
FIG. 2 is a screenshot illustrating an example of a web page presenting search results and refined search queries.

FIG. 2 is a screenshot illustrating an example of a web page presenting search results and refined search queries. The web page 210 includes a search query 220, search results 230a-d and refined search queries 240a-h. In response to a user selecting a refined search query, the refined search query is sent to a search engine (e.g., search engine 140) and search results returned by the search engine can be presented in the web page.

Figure 3:
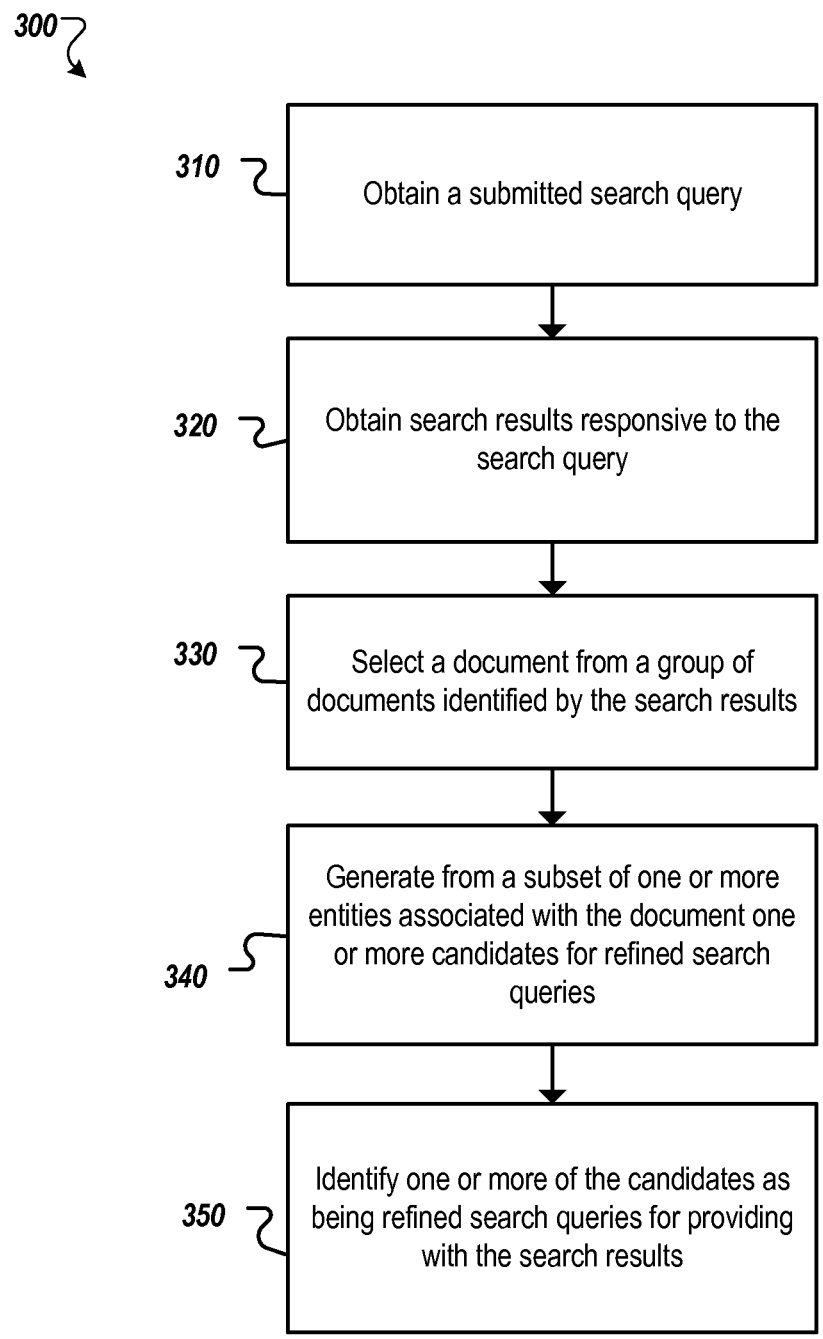
FIG. 3 is a flow chart illustrating an example process for generating refined search queries.

FIG. 3 is a flow chart illustrating an example process 300 for generating refined search queries. The process 300 includes obtaining 310 a submitted search query. The process 300 also includes performing the following steps in response to obtaining the search query. The process 300 includes obtaining 320 search results responsive to the search query. The process 300 also includes selecting 330 a document from a group of documents identified by the search results. The process 300 also includes generating 340 from a subset of one or more entities associated with the document one or more candidates for refined search queries. Generating the one or more candidates for refined search queries can include identifying one or more terms in the search query. The one or more terms occur in the search query in a particular order relative to each other. Generating the one or more candidates for refined search queries can also include combining the one or more terms with the entity to generate a candidate. The one or more terms occur in the particular order relative to each other. The process 300 also includes 350 identifying one or more of the candidates as being refined search queries for providing with the search results.

Figure 4:
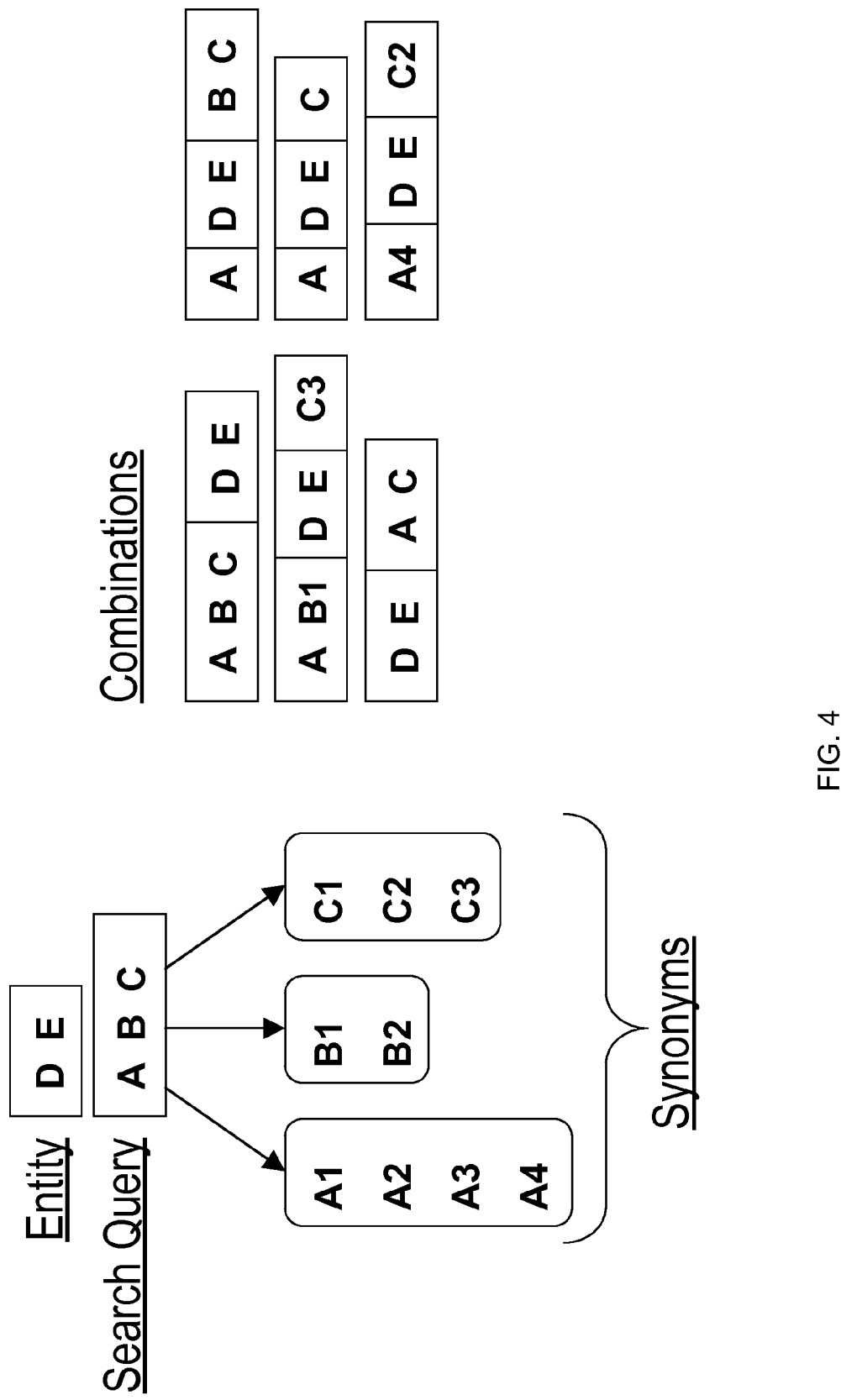
FIG. 4 is a block diagram that includes example combinations of a search query with an entity.

FIG. 4 is a block diagram that includes example combinations of a search query with an entity. An entity including the terms "D E" can be combined with a search query including the terms "A B C", according to the rules and guidelines described above. The terms "A" and "C" can be identified as being important terms, e.g., based on respective IDFs of the terms. "A1", "A2", and "A3" are synonyms of "A". "B1" and "B2" are synonyms of "B". "C1", "C2", and "C3" are synonyms of "C".

In a first combination "A B C D E", the entity is concatenated after the search query. In a second combination "A D E B C", the entity is inserted between "A" and "B C". In a third combination "A B1 D E C3", the entity is inserted between a sequence including "A" and a synonym for "B" and a synonym for "C". In a fourth combination "A D E C", the entity is inserted between "A" and "C". In a fifth combination "D E A C", "A C" is concatenated after the entity. In a sixth combination "A4 D E C2", the entity is inserted between a sequence including a synonym for "A" and a synonym for "C". Note that the example combinations in FIG. 4 do not represent all possible combinations that can be generated according to the rules and guidelines described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementations or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a first search query;
obtaining search results referencing a plurality of documents that a search engine has identified as being responsive to the first search query;
computing a respective count of occurrences of each of a plurality of search queries for which a first document, of the plurality of documents, was identified as being responsive;
designating, as entity text strings for the first document, one or more search queries having a respective count that satisfies a threshold;
generating a refined search query having one or more terms from the one or more entity text strings for the first document, including combining (i) one or more terms of the one or more entity text strings for the first document with (ii) one or more terms of the first search query; and
providing the refined search query having the one or more terms from the one or more entity text strings for the first document in response to receiving the first search query.

2. The method of claim 1, wherein generating the refined search query comprises:
obtaining a first entity text string for the first document; and
generating a first refined search query comprising an unbroken sequence of multiple terms of the first entity text string and one or more terms of the first search query.

3. The method of claim 2, wherein generating the refined search query comprising the unbroken sequence of multiple terms of the first entity text string and one or more terms of the first search query comprises replacing the one or more terms of the first search query with the unbroken sequence of multiple terms of the first entity text string.

4. The method of claim 1, wherein computing the respective count of occurrences of each of the plurality of search queries comprises computing a respective count of occurrences of a plurality of search queries for which the first document was identified by search results presented to users who submitted the first search query.

5. The method of claim 4, wherein computing the respective count of occurrences of each of the plurality of search queries comprises computing a respective count of occurrences of a plurality of search queries for which the first document was identified by search results selected by the users who submitted the first search query.

6. The method of claim 5, wherein computing the respective count of occurrences of each of the plurality of search queries comprises computing a respective count of occurrences of a plurality of search queries for which the first document was identified as being responsive and was viewed for at least a threshold period of time by users who submitted the first search query.

7. The method of claim 1, further comprising:
computing a score for each candidate entity text string of a plurality of candidate entity text strings for the first document;
ranking the candidate entity text strings according to the computed scores; and
associating one or more highest-ranked candidate entity text strings as the one or more entity text strings associated with the document.

8. The method of claim 7, wherein computing the score for each candidate entity text string of the plurality of candidate entity text strings for the document comprises:
receiving an initial score for the candidate entity text string; and
determining whether the candidate entity text string occurs in a title of the document; and
computing the score for the candidate entity text string including increasing the initial score for the candidate entity text string if the candidate entity text string occurs in the title of the document.

9. The method of claim 8, wherein the initial score for the candidate entity text string represents an inverse document frequency score for each term in the candidate entity text string.

10. The method of claim 1, wherein computing the respective count of occurrences of each of a plurality of search queries comprises:
identifying search queries occurring a search log;
determining for which of the search queries in the search log the first document was identified as being responsive; and
computing a count of the search queries in the search log for which the first document was identified as being responsive.

11. A system comprising:
one or more computers and one or more non-transitory computer storage media storing instructions that are operable, when executed by the one or more computers, to cause the one or more computers to perform operations comprising:
receiving a first search query;
obtaining search results referencing a plurality of documents that a search engine has identified as being responsive to the first search query;
computing a respective count of occurrences of each of a plurality of search queries for which a first document, of the plurality of documents, was identified as being responsive;
designating, as entity text strings for the first document, one or more search queries having a count that satisfies a threshold;
generating a refined search query having one or more terms from the one or more entity text strings for the first document, including combining (i) one or more terms of the one or more entity text strings for the first document with (ii) one or more terms of the first search query; and
providing the refined search query having the one or more terms from the one or more entity text strings for the first document in response to receiving the first search query.

12. The system of claim 11, wherein generating the refined search query comprises:
obtaining a first entity text string for the first document; and
generating a first refined search query comprising an unbroken sequence of multiple terms of the first entity text string and one or more terms of the first search query.

13. The system of claim 12, wherein generating the refined search query comprising the unbroken sequence of multiple terms of the first entity text string and one or more terms of the first search query comprises replacing the one or more terms of the first search query with the unbroken sequence of multiple terms of the first entity text string.

14. The system of claim 11, wherein computing the respective count of occurrences of each of the plurality of search queries comprises computing a respective count of occurrences of a plurality of search queries for which the first document was identified by search results presented to users who submitted the first search query.

15. The system of claim 14, wherein computing the respective count of occurrences of each of the plurality of search queries comprises computing a respective count of occurrences of a plurality of search queries for which the first document was identified by search results selected by the users who submitted the first search query.

16. The system of claim 15, wherein computing the respective count of occurrences of each of the plurality of search queries comprises computing a respective count of occurrences of a plurality of search queries for which the first document was identified as being responsive and was viewed for at least a threshold period of time by users who submitted the first search query.

17. The system of claim 11, wherein the operations further comprise:
computing a score for each candidate entity text string of a plurality of candidate entity text strings for the first document;
ranking the candidate entity text strings according to the computed scores; and
associating one or more highest-ranked candidate entity text strings as the one or more entity text strings associated with the document.

18. The system of claim 17, wherein computing the score for each candidate entity text string of the plurality of candidate entity text strings for the document comprises:
receiving an initial score for the candidate entity text string; and
determining whether the candidate entity text string occurs in a title of the document; and
computing the score for the candidate entity text string including increasing the initial score for the candidate entity text string if the candidate entity text string occurs in the title of the document.

19. The system of claim 18, wherein the initial score for the candidate entity text string represents an inverse document frequency score for each term in the candidate entity text string.

20. The system of claim 11, wherein computing the respective count of occurrences of each of a plurality of search queries comprises:
   identifying search queries occurring a search log;
   determining for which of the search queries in the search log the first document was identified as being responsive; and
   computing a count of the search queries in the search log for which the first document was identified as being responsive.

21. A computer program product, encoded on one or more non-transitory computer storage media, comprising instructions that when executed by one or more computers cause the one or more computers to perform operations comprising;
   receiving a first search query;
   obtaining search results referencing a plurality of documents that a search engine has identified as being responsive to the first search query;
   computing a respective count of occurrences of each of a plurality of search queries for which a first document, of the plurality of documents, was identified as being responsive;
   designating, as entity text strings for the first document, one or more search queries having a count that satisfies a threshold;
   generating a refined search query having one or more terms from the one or more entity text strings for the first document, including combining (i) one or more terms of the one or more entity text strings for the first document with (ii) one or more terms of the first search query; and
   providing the refined search query having the one or more terms from the one or more entity text strings for the first document in response to receiving the first search query.

\* \* \* \* \*